US011895501B2

(12) United States Patent
Rajput et al.

(10) Patent No.: US 11,895,501 B2
(45) Date of Patent: Feb. 6, 2024

(54) METHODS, SYSTEMS, AND COMPUTER READABLE MEDIA FOR AUTOMATIC KEY MANAGEMENT OF NETWORK FUNCTION (NF) REPOSITORY FUNCTION (NRF) ACCESS TOKEN PUBLIC KEYS FOR 5G CORE (5GC) AUTHORIZATION TO MITIGATE SECURITY ATTACKS

(71) Applicant: Oracle International Corporation, Redwood Shores, CA (US)

(72) Inventors: Jay Rajput, Bangalore (IN); Shashikiran Bhalachandra Mahalank, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 183 days.

(21) Appl. No.: 17/115,746

(22) Filed: Dec. 8, 2020

(65) Prior Publication Data
US 2022/0182835 A1   Jun. 9, 2022

(51) Int. Cl.
H04L 29/06 (2006.01)
H04W 12/122 (2021.01)
(Continued)

(52) U.S. Cl.
CPC ...... *H04W 12/122* (2021.01); *G06F 16/2379* (2019.01); *H04L 9/0891* (2013.01);
(Continued)

(58) Field of Classification Search
CPC ... H04W 12/122; H04W 12/04; H04W 12/08; H04W 84/042; G06F 16/2379;
(Continued)

(56) References Cited

U.S. PATENT DOCUMENTS 8,619,688 B2   12/2013   Ramakrishna
10,104,123 B2  10/2018   Ganda et al.
(Continued)

FOREIGN PATENT DOCUMENTS

CN   102137428 B    10/2013
EP   3 570 515 A1   11/2019
(Continued)

OTHER PUBLICATIONS

Mujtahid Akon; Yilu Dong, Syed Rafiul Hussain; Tianchang Yang; Formal Analysis of Access Control Mechanism of 5G Core Network; CCS '23: Proceedings of the 2023 ACM SIGSAC Conference on Computer and Communications Security; Nov. 2023, pp. 666-680 (Year: 2023).*

(Continued)

*Primary Examiner* — Fatoumata Traore
*Assistant Examiner* — Courtney D Fields
(74) *Attorney, Agent, or Firm* — Jenkins, Taylor & Hunt, P.A.

(57) ABSTRACT

A method for automatic key management of network access token public keys for 5GC authorization to mitigate security attacks includes providing, at the NRF, a network access token public key status update notification subscription interface that allows producer NFs to subscribe to receive notifications of updates in status of service access token public keys issued by the NRF. When the NRF determines that an update in status of a service access token public key is required, the NRF updates the status of the public key in its local database and notifies producer NFs that have subscribed to receive the updates. The producer NFs use the public keys to validate service requests from consumer NFs. In one variation, the NRF maintains and updates the status of service access token public keys associated with different service access levels.

20 Claims, 5 Drawing Sheets

(51) Int. Cl.
G06F 16/23 (2019.01)
H04L 9/08 (2006.01)
H04L 9/30 (2006.01)
H04W 12/04 (2021.01)
H04W 12/08 (2021.01)
H04L 9/32 (2006.01)
H04W 8/02 (2009.01)
H04W 84/04 (2009.01)

(52) U.S. Cl.
CPC ............... *H04L 9/30* (2013.01); *H04W 12/04* (2013.01); *H04W 12/08* (2013.01); *H04W 84/042* (2013.01)

(58) Field of Classification Search
CPC ....... H04L 9/0891; H04L 9/30; H04L 9/3213; H04L 63/0823; H04L 63/062
See application file for complete search history.

(56) References Cited

U.S. PATENT DOCUMENTS

| | | | |
|---|---|---|---|
| 11,425,636 B1 * | 8/2022 | Aggarwal | H04W 12/08 |
| 11,553,524 B2 | 1/2023 | Singh et al. | |
| 2007/0118653 A1 | 5/2007 | Bindal | |
| 2010/0272036 A1 | 10/2010 | Ramakrishna | |
| 2017/0085591 A1 | 3/2017 | Ganda et al. | |
| 2017/0230779 A1 | 8/2017 | Wang et al. | |
| 2018/0089249 A1 | 3/2018 | Collins et al. | |
| 2018/0332629 A1 | 11/2018 | Huang et al. | |
| 2019/0253894 A1 * | 8/2019 | Bykampadi | H04L 67/51 |
| 2020/0007335 A1 | 1/2020 | Tan et al. | |
| 2020/0267214 A1 * | 8/2020 | Yang | H04L 67/1001 |
| 2020/0322775 A1 * | 10/2020 | Lee | H04W 8/02 |
| 2020/0403924 A1 | 12/2020 | Jiang et al. | |
| 2021/0152380 A1 | 5/2021 | Yan et al. | |
| 2021/0168215 A1 | 6/2021 | Zong et al. | |
| 2021/0240554 A1 | 8/2021 | Landais et al. | |
| 2021/0288973 A1 | 9/2021 | Dimble et al. | |
| 2021/0297896 A1 | 9/2021 | Landais et al. | |
| 2021/0306326 A1 | 9/2021 | Bykampadi et al. | |
| 2022/0052992 A1 | 2/2022 | Zhang et al. | |
| 2022/0086734 A1 | 3/2022 | Aggarwal et al. | |
| 2022/0159464 A1 | 5/2022 | Rajput | |
| 2022/0287089 A1 | 9/2022 | Singh et al. | |
| 2022/0353255 A1 | 11/2022 | S Bykampadi et al. | |
| 2023/0007475 A1 | 1/2023 | He et al. | |
| 2023/0171099 A1 | 6/2023 | Krishan et al. | |

FOREIGN PATENT DOCUMENTS

| | | | | |
|---|---|---|---|---|
| EP | 3570515 A1 * | 11/2019 | | H04L 63/08 |
| EP | 3 188 069 B1 | 3/2020 | | |
| EP | 3886390 A1 | 9/2021 | | |
| EP | 4241420 A1 | 9/2023 | | |
| KR | 10-2011-0108416 A | 10/2011 | | |
| WO | WO 2022/098405 A1 | 5/2022 | | |
| WO | WO 2022/186911 A1 | 9/2022 | | |

OTHER PUBLICATIONS

Commonly-Assigned, Co-pending U.S. Appl. No. 17/192,800 for "Methods, Systems, and Computer Readable Media for Resource Object Level Authorization at a Network Function (NF)," (Unpublished, filed Mar. 4, 2021).

Commonly-Assigned, Co-pending U.S. Appl. No. 17/134,635 for "Methods, Systems, and Computer Readable Media for Utilizing Network Function Identifiers To Implement Ingress Message Rate Limiting," (Unpublished, filed Dec. 28, 2020).

"3rd Generation Partnership Project; Technical Specification Group Core Network and Terminals; 5G System; Principles and Guidelines for Services Definition; Stage 3 (Release 17)," 3GPP TS 29.501, V17.0.0, pp. 1-78 (Dec. 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

"3rd Generation Partnership Project; Technical Specification Group Services and System Aspects; Security architecture and procedures for 5G system (Release 17)," 3GPP TS 33.501, V17.0.0, pp. 1-253 (Dec. 2020).

"3rd Generation Partnership Project; Technical Specification Group Services and System Aspects; Security architecture and procedures for 5G system (Release 16)," 3GPP TS 33.501, V16.3.0, pp. 1-248 (Jul. 2020).

"3rd Generation Partnership Project; Technical Specification Group Core Network and Terminals; 5G System; Network Function Repository Services; Stage 3 (Release 16)," 3GPP TS 29.510, V16.4.0, pp. 1-209 (Jul. 2020).

"3rd Generation Partnership Project; Technical Specification Group Core Network and Terminals; 5G System; Network Function Repository Services; Stage 3 (Release 16)," 3GPP TS 29.510, V16.5.0, pp. 1-208 (Sep. 2020).

"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).

"3rd Generation Partnership Project; Technical Specification Group Services and System Aspects; Security architecture and procedures for 5G system (Release 16)," 3GPP TS 33.501, V16.4.0, pp. 1-249 (Sep. 2020).

Jones et al., "JSON Web Token (JWT)," RFC 7519, pp. 1-30 (May 2015).

Jones et al., "JSON Web Signature (JWS)," RFC 7515, pp. 1-59 (May 2015).

Jones et al., "The OAuth 2.0 Authorization Framework: Bearer Token Usage," RFC 6750, pp. 1-18 (Oct. 2012).

Hardt, "The OAuth 2.0 Authorization Framework," RFC 6749, pp. 1-76 (Oct. 2012).

Dierks et al., "The Transport Layer Security (TLS) Protocol Version 1.2," RFC 5246, pp. 1-104 (Aug. 2008).

Housley et al., "Internet X.509 Public Key Infrastructure Certificate and Certificate Revocation List (CRL) Profile," RFC 3280, pp. 1-129 (Apr. 2002).

Notice of Allowance and Fee(s) Due for U.S. Appl. No. 17/192,800 (dated Jun. 14, 2022).

Ericsson, "Cleanup, including removal of Editor's Notes," 3GPP TSG-SA3 Meeting #100e, pp. 1-48 (Aug. 17-28, 2020).

Notification of Transmittal of the International Search Report and the Written Opinion of the International Searching Authority, or the Declaration for International Application No. PCT/US2022/013268 (dated Apr. 7, 2022).

Notification of Transmittal of the International Search Report and the Written Opinion of the International Searching Authority, or the Declaration for International Application No. PCT/US2021/057158 (dated Jan. 27, 2022).

Notification of Transmittal of the International Search Report and the Written Opinion of the International Searching Authority, or the Declaration for International Application No. PCT/US2022/0138268 (dated Apr. 7, 2022).

Non-Final Office Action for U.S. Appl. No. 17/192,800 (dated Feb. 24, 2022).

Oh et al. "Study on Access Permission Control for the Web of Thing," 17th International Conference on Advanced Communication Technology (ICACT), pp. 574-5801 (Aug. 2015).

"3rd Generation Partnership Project; Technical Specification Group Services and System Aspects; Security Aspects; Study on security aspects of the 5G Service Based Architecture (SBA) (Release 16)," 3GPP TR 33.855, V16.0.0, pp. 1-104 (Jul. 2020).

"3rd Generation Partnership Project; Technical Specification Group Core Network and Terminals; 5G System; Technical Realization of Service Based Architecture; Stage 3 (Release 17)," 3GPP TS 29.500, V17.0.0, pp. 1-82 (Sep. 2020).

(56) References Cited

OTHER PUBLICATIONS

Notification of Transmittal of the International Search Report and the Written Opinion of the International Searching Authority, or the Declaration for International Application No. PCT/US2021/042662 (dated Oct. 26, 2021).
Jiahui et al., "A New Model for Continuous Network Access Control of Trust Network Connection," IEEE, pp. 1-5 (2009).
Notice of Allowance and Fee(s) Due for U.S. Appl. No. 17/192,800 (dated Aug. 26, 2022).
Non-Final Office Action for U.S. Appl. No. 17/134,635 (dated Jan. 31, 2023).
Notice of Publication for European Patent Application Serial No. 21755217.3 (dated Aug. 17, 2023).
Applicant-Initiated Interview Summary for U.S. Appl. No. 17/134,635 (dated Sep. 8, 2023).
Final Office Action for U.S. Appl. No. 17/134,635 (dated Jul. 10, 2023).
Applicant-Initiated Interview Summary for U.S. Appl. No. 17/134,635 (dated May 1, 2023).
"3rd Generation Partnership Project; Technical Specification Group Services and System Aspects; Security architecture and procedures for 5G system (Release 17)," 3GPP TS 33.501, V17.3.0, pp. 1-258 (Sep. 2021).
"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).
Jones et al. "JSON Web Signature (JWS)," Internet Engineering Task Force (IETF), Request for Comments 7515, pp. 1-59 (May 2015).

* cited by examiner

METHODS, SYSTEMS, AND COMPUTER READABLE MEDIA FOR AUTOMATIC KEY MANAGEMENT OF NETWORK FUNCTION (NF) REPOSITORY FUNCTION (NRF) ACCESS TOKEN PUBLIC KEYS FOR 5G CORE (5GC) AUTHORIZATION TO MITIGATE SECURITY ATTACKS

TECHNICAL FIELD

The subject matter described herein relates to enhancing security in 5G communication networks. More particularly, the subject matter described herein relates to methods, systems, and computer readable media for automatic key management of NRF access token public keys for 5GC authorization to mitigate security attacks.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing a service. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages.

3GPP TS 33.501 defines the security architecture and procedures for accessing services in 5G networks. Section 13.4 of 3GPP TS 33.501 describes the use of OAuth 2.0 as the authorization procedure for consumer NFs to access services provided by producer NFs in 5G networks. OAuth 2.0 is defined in Internet Engineering Task Force (IETF) Request for Comments (RFC) 6749. OAuth 2.0 is an authentication model for a client to obtain access to a protected resource on a server by authenticating with the server using the resource owner's credentials. OAuth 2.0 defines four roles. The first role is the resource owner, which is an entity capable of granting access to a protected resource. The second role is the resource server, which is the server hosting the protected resource, capable of accepting and responding to protected resource requests and authenticating the requests using access tokens. The client is the entity that is requesting access to the protected resource. The fourth role defined in OAuth 2.0 is the authorization server which issues access tokens to the client after successfully authenticating the resource owner and obtaining authorization. Section 13.4.1 of 3GPP TS 33.501 defines the roles of 5G network elements in the OAuth 2.0 framework, specifying that the NRF is the OAuth 2.0 authorization server, the NF service consumer is the OAuth 2.0 client, and the NF service producer is the OAuth 2.0 resource server.

While RFC 6749 defines a framework for authentication, RFC 6749 does not define a key management procedure for the cryptographic keys used in performing such authentication. The framework defines the roles described above for the resource server, the authorization server, and the resource client, but does not specify key management by the authorization server for distributing and updating the status of public keys distributed to resource servers to authenticate service requests from resource clients.

OAuth 2.0 authentication is performed using an access token issued by the NRF and used by consumer NFs to access services provided by producer NFs. In one possible authentication method that that is based on an asymmetric cryptographic algorithm, a portion of the access token is signed using the private key of the NRF. The public key of the NRF is distributed to producer NFs in the network and used to validate access tokens received from consumer NFs. Specifically, 3GPP TS 33.501 indicates that access tokens shall be JSON Web tokens as described in RFC 7519 and are secured with digital signatures or Message Authentication Codes (MAC) based on JSON Web Signature (JWS) as described in RFC 7515.

One problem with this authentication mechanism is that the 3GPP has not defined a key management procedure for the public keys maintained by the NRF for access token integrity checks at producer NFs. For example, there is no procedure to revoke an OAuth 2.0 NRF-issued public key when keys are compromised due to security attacks and instead requires manual re-provisioning of keys at producer NFs. Performing manual re-provisioning can disrupt services provided by the producer NFs.

Another related problem is there is no procedure defined by 3GPP to manage NRF access token public keys associated with different service access levels, such as the public land mobile network (PLMN) level, network slice level, network function level, service level, etc. An NRF deployment may typically include a single access token public key for a given NRF. The inability to specify and manage access token public keys at different service access levels limits the flexibility of service access control and threat mitigation in 5G network deployments.

In light of these difficulties, there exists a need for improved methods, systems, and computer readable media for access token key management.

SUMMARY

A method for automatic key management of network access token public keys for 5G core (5GC) authorization to mitigate security attacks includes steps performed at a network function (NF) repository function (NRF) including at least one processor and a memory. The steps include maintaining in the memory, a network access token public key database including at least one public key for use by producer NFs in validating network access tokens presented in service requests from consumer NFs. The steps further include providing, to the producer NFs, a network access token public key status notification subscription interface for allowing the producer NFs to subscribe to receive notification of updates in status of the at least one public key. The steps further include receiving, via the network access token public key status notification subscription interface, a request from a producer NF to be notified of updates in status of the at least one public key, and, in response, creating a subscription for the producer NF. The steps further include determining that an update in status of the at least one public key is needed. The steps further include in response to determining that the update in status of the at least one public key is needed: updating the status of the at least one public key; identifying, from the subscription, that the producer NF is subscribed to receive notification of updates in status of the at least one public key; and notifying the producer NF of the update in status of the at least one public key.

According to another aspect of the subject matter described herein, maintaining the network access token public key database includes maintaining, in the network access token public key database, a plurality of public keys, at least some of which are associated with different service access levels.

According to another aspect of the subject matter described herein, the different service access levels include a public land mobile network (PLMN) service level, a network slice level, an NF type level, and a service level.

According to another aspect of the subject matter described herein, the at least one public key is associated with one of the service access levels and updating the status of the at least one public key includes revoking the public key at the one service access level.

According to another aspect of the subject matter described herein, providing the public key status notification subscription interface includes providing an interface for receiving subscription requests from the producer NFs, where the subscription requests can include service access level identification information and a request for an immediate key.

According to another aspect of the subject matter described herein, the subscription request includes the request for an immediate key and further comprising communicating a public key to the producer NF in response to the subscription request.

According to another aspect of the subject matter described herein, creating the subscription includes creating or updating a record in the database to identify the NF as a subscriber to the updates in status of the at least one public key.

According to another aspect of the subject matter described herein, determining that an update in status of the at least one public key is needed includes determining that at least one network access token signed using at least one private key corresponding to the at least one public key has been compromised and updating the status of the at least one public key includes revoking the at least one public key.

According to another aspect of the subject matter described herein, determining that a change in status of the at least one public key is needed includes determining that a revocation of the at least one public key is needed in response to expiration of a configurable time period and updating the status of the at least one public key includes revoking the at least one public key.

According to another aspect of the subject matter described herein, the method for automatic key management to mitigate security attacks includes, at the producer NF: receiving the notification of the update in status of the at least one public key, where the notification of the update in status includes at least one replacement public key for the at least one public key; receiving a service request from a consumer NF, the service request including a network access token; attempting to validate the service request using the at least one replacement public key; determining that the validation fails; and preventing the consumer NF from accessing a service identified in the service request.

According to another aspect of the subject matter described herein, a system for automatic key management of network access token public keys for 5G core (5GC) to mitigate security attacks is provided. The system includes a network function (NF) repository function (NRF) including at least one processor and a memory. The system further includes a network access token public key database located in the memory and including at least one public key for use by producer NFs in validating network access tokens presented in service requests from consumer NFs. The system further includes an automatic access token key manager implemented by the at least one processor for maintaining the network access token public key database, providing, to the producer NFs, a network access token public key status notification subscription interface for allowing the producer NFs to subscribe to receive notification of updates in status of the at least one public key, receiving, via the network access token public key status notification subscription interface, a request from a producer NF to be notified of updates in status of the at least one public key, and, in response, creating a subscription for the producer NF, determining that an update in status of the at least one public key is needed, and in response to determining that the update in status of the at least one public key is needed: updating the status of the at least one public key; identifying, from the subscription, that the producer NF is subscribed to receive notification of updates in status of the at least one public key; and notifying the producer NF of the update in status of the at least one public key.

According to another aspect of the subject matter described herein, the automatic access token key manager is configured to maintain, in the network access token public key database, a plurality of public keys, at least some of which are associated with different service access levels.

According to another aspect of the subject matter described herein, the different service access levels include a public land mobile network (PLMN) level, a network slice level, an NF type level, and a service level.

According to another aspect of the subject matter described herein, the at least one public key is associated with one of the service access levels and updating the status of the at least one public key includes revoking the public key at the one service access level.

According to another aspect of the subject matter described herein, the network access token public key status notification subscription interface is configured to receive subscription requests from the producer NFs, where the subscription requests can include service access level identification information and a request for an immediate key.

According to another aspect of the subject matter described herein, the subscription request includes the request for an immediate key and, in response, the automatic access token key manager is configured to communicate a public key to the producer NF in response to the subscription request.

According to another aspect of the subject matter described herein, in creating the subscription, the automatic access token key manager is configured to create or update a record in the database to identify the NF as a subscriber to the updates in status of the at least one public key.

According to another aspect of the subject matter described herein, the automatic access token key manager is configured to determine that an update in status for the at least one public key is needed in response to determining that at least one access token signed using at least one private key corresponding to the at least one public key has been compromised and to update the status of the at least one public key by revoking the at least one public key.

According to another aspect of the subject matter described herein, the automatic access token key manager is configured to determine that an update in status for the at least one public key is needed in response to expiration of a configurable time period and to update the status of the at least one public key by revoking the at least one public key.

According to another aspect of the subject matter described herein, A non-transitory computer readable medium having stored thereon executable instructions that when executed by a processor of a computer control the computer to perform steps is provided. The steps include maintaining, in the non-transitory computer readable medium, a network access token public key database including at least one public key for use by producer network functions (NFs) in validating network access tokens presented in service requests from consumer NFs. The steps further include providing, to the producer NFs, a network access token public key status notification subscription interface for allowing the producer NFs to subscribe to receive notification of updates in status of the at least one public key. The steps further include receiving, via the network access token public key status notification subscription interface, a request from a producer NF to be notified of updates in status of the at least one public key, and, in response, creating a subscription for the producer NF. The steps further include determining that an update in status of the at least one public key is needed. The steps further include, in response to determining that the update in status of the at least one public key is needed: updating the status of the at least one public key; identifying, from the subscription, that the producer NF is subscribed to receive notification of updates in status of the at least one public key; and notifying the producer NF of the update in status of the at least one public key.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms. The subject matter described herein may also be implemented as a cloud-based service, where the non-transitory computer readable medium and the processor(s) that execute the instructions embodied in the computer readable medium each reside in a cloud network.

BRIEF DESCRIPTION OF THE DRAWINGS

The subject matter described herein will now be explained with reference to the accompanying drawings of which.

DETAILED DESCRIPTION

Figure 1:
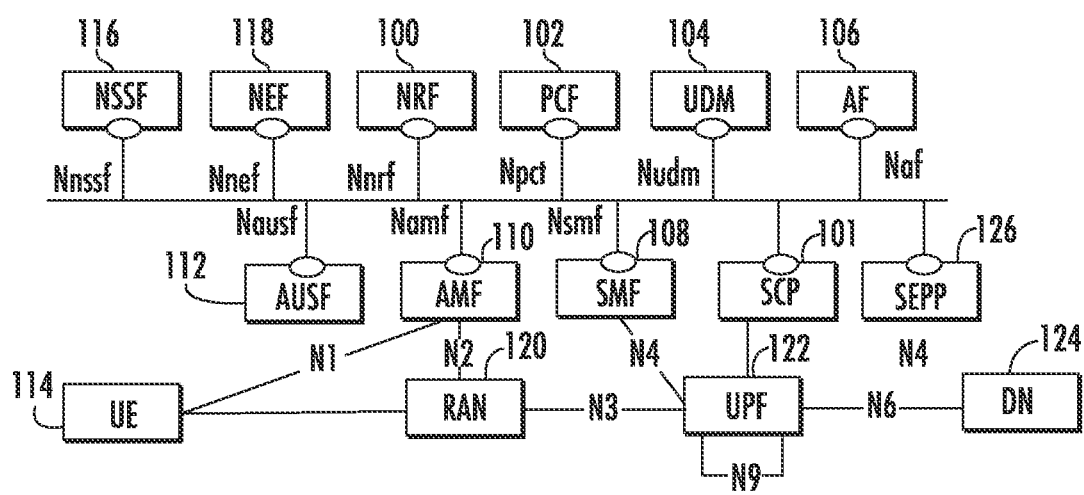
FIG. 1 is a network diagram illustrating an exemplary 5G network architecture.

The subject matter described herein relates to methods, systems, and computer readable media for automatic NRF public key management for mitigating 5G security attacks. FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. NRF 100 may also issue OAuth 2.0 access tokens and perform automatic access token key management. SCP 101 may also support service discovery and selection of producer NF instances. SCP 101 may perform load balancing of connections between consumer and producer NFs. SCP 101 may also request and obtain OAuth 2.0 access tokens from NRF 100 on behalf of consumer NF.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address or an IP version 6 (IPv6) address. In FIG. 1, any of the network functions (other than NRF 100) can be consumer NFs producer NFs, or both, depending on whether they are requesting, providing, or requesting and providing services. In the illustrated example, the NFs include a policy control function (PCF) 102 that performs policy related operations in a network, a unified data management (UDM) function 104 that manages user data, and an application function (AF) 106 that provides application services. The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

Figure 2:
FIG. 2 is a message flow diagram illustrating an exemplary message flow associated with an NF service consumer obtaining an access token from an NRF.

FIG. 2 is a message flow diagram illustrating the procedure for obtaining an access token from an NRF according to the OAuth 2.0 framework. According to the interface specification, the NRF acts as the OAuth 2.0 authorization server. The NF service consumer acts as the OAuth 2.0 client. The NF service producer acts as the OAuth 2.0 resource server. Referring to the message flow in FIG. 2, in line 1, consumer NF 200 requests an access token from NRF 100 in the same PLMN. The procedure used to obtain the access token is the Nnrf_AccessToken_Get request operation. The Nnrf_AccessToken_Get request message includes the NF instance IDs of the NF service consumer, the requested scope including the expected NF service names and adopt optionally additional scope information (i.e., requested resources and requested actions (service operations) on the resources), NF type of the expected NF producer instance and NF consumer. The service consumer may also include a list of NSSAIs or list of NF IDs for the expected NF producer instances. The message may also include the NF set ID of the expected NF service producer instances.

In response to receiving the Nnrf_AccessToken_Get request, the NRF may optionally authorize the NF service consumer. The NRF will then generate an access token with appropriate claims included. The NRF digitally signs a portion of the generated access token based on a shared secret or a private key as described in IETF RFC 7515. The claims in the access token include the NF instance ID of the NRF (issuer), the NF instance ID of the NF service consumer (subject), the NF type of the NF service producer (audience), expected service names, scope, expiration time, and optionally additional scope information (allowed resources and allowed actions). The claims may also include a list of NSSAIs or NSSIDs for the expected producer NF instances. The claims may include the NF set ID of the expected NF service producer instances.

If authorization of the NF service consumer is successful, in line 2A, the NRF sends the access token to the NF service consumer in an Nnrf_AccessToken_Get response operation. If the authentication is not successful, the NRF replies as indicated in line 2B, with an OAuth 2.0 error response defined in IETF RFC 6749. The digitally signed access token may be issued in the form of a JavaScript Object Notation (JSON) Web Signature (JWS) compact serialization encoded string in the response sent to consumer NF 200. The JWS compact notation is defined in IETF RFC 7515 and is a data structure representing a digitally signed or message authentication coded message.

Consumer NF 200 stores the access token and includes the access token in service requests to producer NFs in the same PLMN. Upon receiving a service request with an access token, a producer NF, which is preconfigured with the public key of the NRF, uses the public key to verify the digital signature in the access token. If the digital signature in the access token is verified, the producer NF responds to the service request with a response that grants the consumer NF access to the service. If the digital signature in the access token is not verified, the producer NF responds to the service request with a message indicating that access to the requested service is denied.

Figure 3:
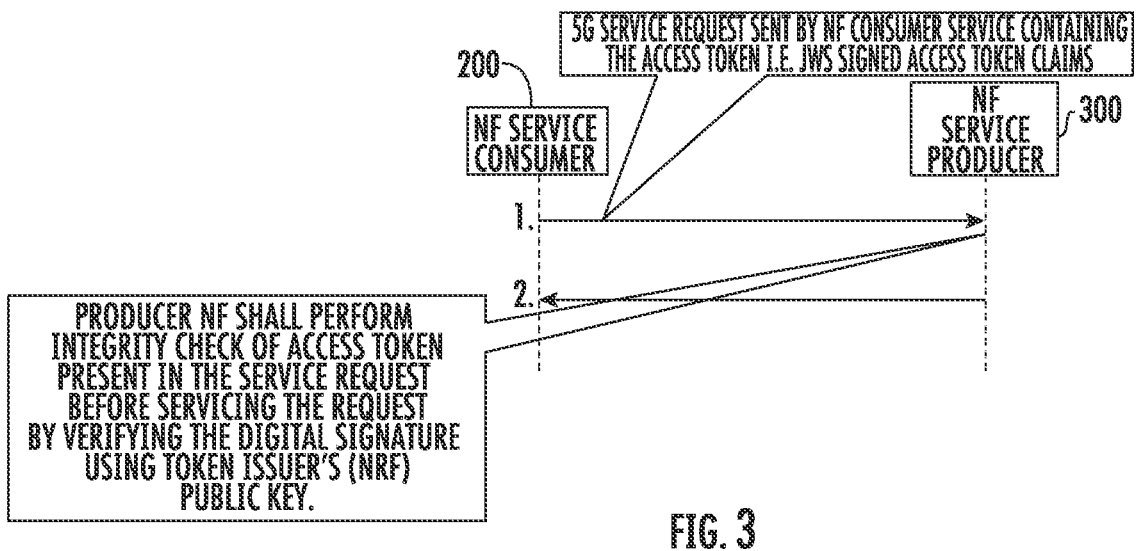
FIG. 3 is a message flow diagram illustrating an NF service consumer using an access token to obtain authorization from an NF service producer for accessing a service provided by the NF service producer.

FIG. 3 illustrates the use of an access token to obtain a service from a producer NF. Referring to FIG. 3, in line 1, consumer NF 200 sends a service request to producer NF 300. Consumer NF 200 includes the NRF issued access token in the service request. As stated above, the NRF-issued access token includes a JWS compact serialization signed using the private key of the NRF.

Upon receiving the service request, producer NF 300 ensures the integrity of the token by verifying the signature using the NRF's public key, which is provisioned with the producer NF before the producer NF receives the service request. In the example illustrated in FIG. 3, it is assumed that the service request is validated. Accordingly, in line 2, producer NF 300 sends a message to consumer NF 200 indicating that the service request has been validated and grants access to the requested service.

As stated above, problems with this architecture include the fact that the IETF and 3GPP specifications do not specify an automatic management procedure for the public keys issued by the NRF. As a result, OAuth 2.0 access token NRF public keys may be manually provisioned and manually maintained at producer NFs. There is no defined automated mechanism for the NRF to update the status of public keys with producer NFs. In addition, there is currently no 3GPP-defined mechanism for issuing access token public keys for different service access levels.

In order to address at least some of these difficulties, the subject matter described herein includes an automatic access token public key management procedure implemented by the NRF. The procedure provides for automatic provisioning, renewal, replacement, and revocation of access token public keys at producer NFs. In addition, the service provided by the NRF enables different public key management at different service access levels, including PLMN level, network slice level, NF type level, service level, etc.

According to the network access token public key status update subscription service, each producer NF for which the network operator wishes to participate in automated access token key management will send an access token NRF public key update subscription request to the NRF for subscribing to receive notification of updates in status of an access token public key. The subscription request may optionally include a request for an immediate key to indicate to the NRF to send an access token public key immediately in the subscription response in the event that the producer NF is not currently provisioned with the access token public key. In response to the subscription request, the NRF creates a subscription in its local database to indicate that the producer NF is subscribed to receive notifications of updates in status of the public key.

The public key to which the subscription request is directed may be identified by service access level parameters in the subscription request. For example, if the subscription request identifies the requested service access level of the subscription to be PLMN, then the NRF will create or update a record in its database indicating that the requestor is subscribed to receive notifications of updates in status of the public key for the PLMN service access level. If the subscription request identifies the requested service access of the subscription as NSSAI, the NRF will create or update in its database indicating that the service access level of the subscription is a network slice identified by the NSSAI and provide updates in status of the public key used for service verification at the NSSAI level.

When the NRF determines that an update in status of one of the public keys is needed, e.g., due to an access token signed using a private key corresponding to the public key being compromised or expiration of a configurable time period, the NRF generates notifications to subscribed producer NFs of the update in status. The update in status can be a renewal, a revocation, a replacement, or any update in status of a public key. In addition, as described above, the NRF can issue different public keys with different service access levels, including but not limited to, PLMN level, individual slice level, NF type level, and service level, based on the subscription request sent by the producer NF, which in this instance is acting as a consumer. For example, a private key with the service access level of PLMN may be used by the NRF to generate a PLMN-wide network access token, which may be used by a consumer NF to access services provided by any producer NF within the PLMN. The revocation the public key corresponding to the private key with the service access level of PLMN will prevent attackers from using the PLMN-wide access token to access any NF within the PLMN. If a public key has a service access level of NSSAI, the NRF may use the corresponding private key to generate an NSSAI network access token which is usable by consumer NFs to access services provided by producer NFs within the NSSAI. If the NRF subsequently revokes the NSSAI-specific public key, the tokens generated using the corresponding to the corresponding private key can no longer be used successfully by attackers to access services in the network slice. Because the revoked key is network slice specific, tokens signed using public keys with different service access levels are not affected. As a result, the methodology described herein provides for increased flexibility in managing access to network services over a single-level approach.

As an added security measure, the NRF may only process a subscription request from a given producer NF if the producer NF is registered with the NRF. The communication between the NRF and the producer NF subscribing to receive notifications of updates in key status may be secured using mutual transport layer security (MTLS) or network domain security/Internet protocol (NDS/IP), similar to other SBI service operations.

Figure 4:
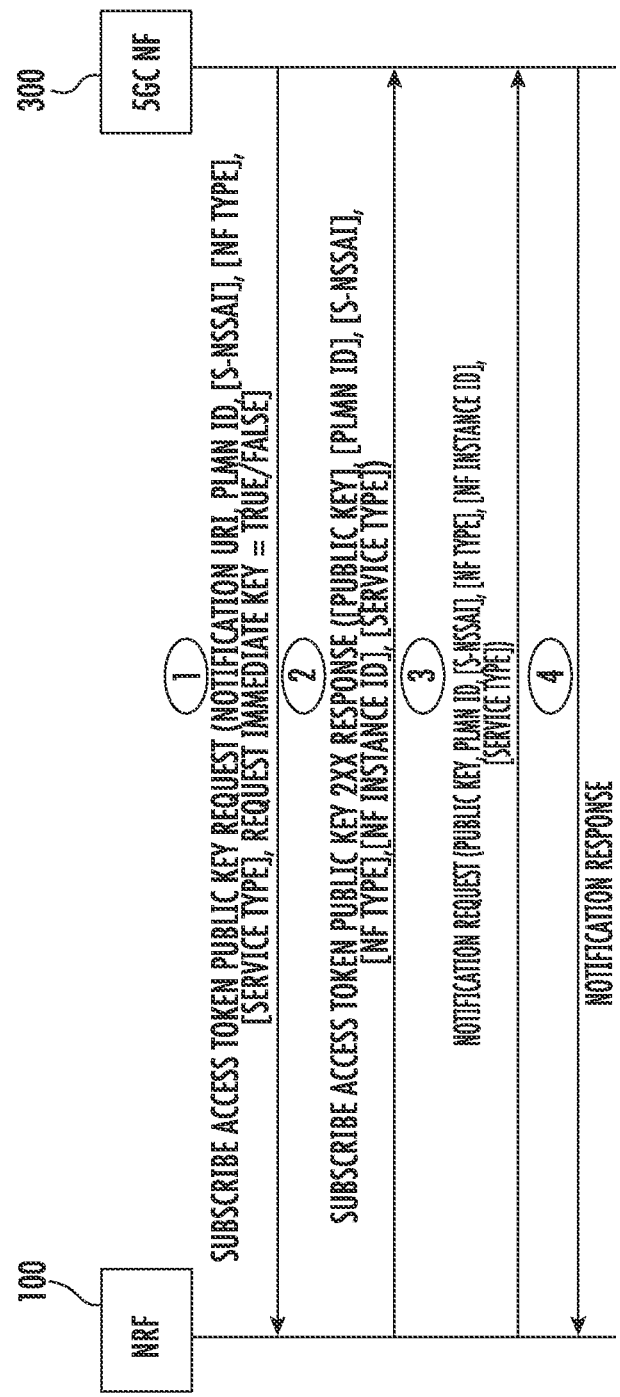
FIG. 4 is a message flow diagram illustrating exemplary messages exchanged between an NRF and an NF service consumer where the NF service consumer subscribes to receive notification of updates in status of access token public keys maintained by the NRF.

FIG. 4 is a message flow diagram illustrating the access token public key management service provided by the NRF. Referring to FIG. 4, in line 1, a 5G producer NF 300 acting as a service consumer for purposes of the subscription service sends a message to NRF 100 subscribing to receive notifications of updates in status of an access token public key. The subscription request includes a notification uniform resource identifier (URI) at which the subscribing NF is to be notified of updates in status of the key, a PLMN ID, and service access level identification parameters associated with the subscription. The service access level identification parameters along with the PLMN ID may be used to select one or more public keys about which producer NF 300 wishes to subscribe to receive notifications of updates in status. In the illustrated example, the service level identification parameters include single network slice selection assistance information (S-NSSAI), NF type, and service type. The subscription request also includes an indicator as to whether an immediate key is requested. If an immediate key is requested, this is a new subscription, and producer NF 300 is subscribing to receive not only notifications of changes in status of a key but the current public key of NRF 100.

NRF 100 uses the PLMN ID and the service access level identification parameters to select a public key about which producer NF 300 desires to receive updates in status and creates a subscription by updating or creating a record in its key management database identifying producer NF 300 as a subscribing NF to the public key identified by the parameters in the request. In line 2 of the message flow diagram, NRF 100 sends a subscribe access token public key 2XX response, which contains the public key (in the case where an immediate key was requested) as well as the service access level identifying parameters. In the case where an immediate key was not requested, the response may simply indicate a successful subscription without including the public key and the service access level identifying parameters.

When NRF 100 determines that an update in status of a public key maintained in its database is required, NRF 100 updates the status of the public key and notifies producer NFs that are subscribed to receive the notifications of the change in status. One such instance is illustrated by line 3 of the message flow diagram where NRF 100 sends a notification request to producer NF 300. The notification request contains a new public key, whenever the current public key is being replaced or revoked and also contains the service access level identifying parameters. In line 4 of the message flow diagram, producer NF 300 acknowledges the notification request with a notification response.

Figure 5:
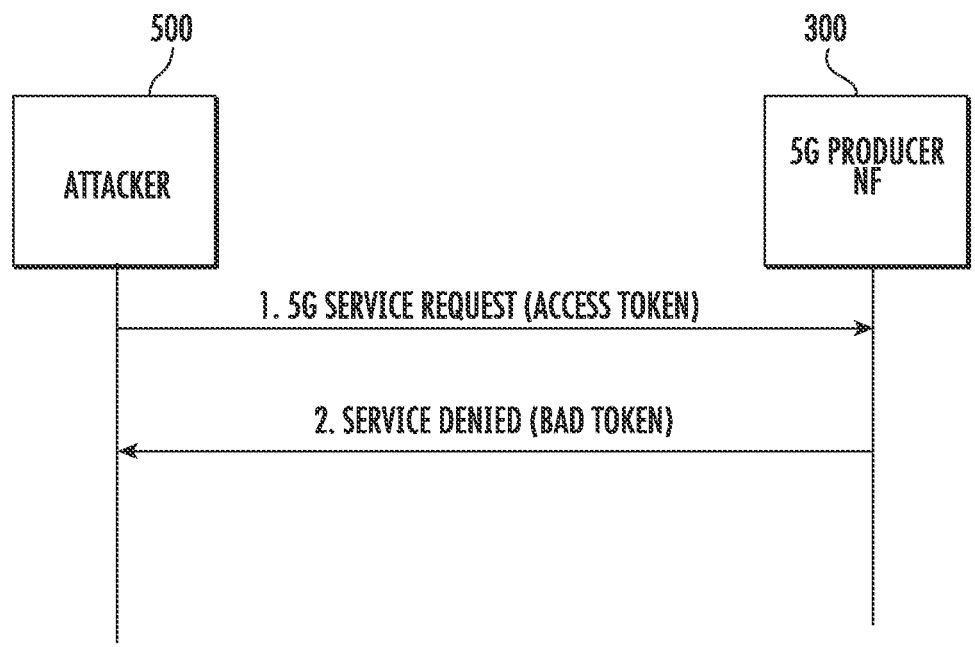
FIG. 5 is a message flow diagram illustrating the blocking of access to a service by an NF service producer in response to a service request with an access token signed using an unauthorized key.

FIG. 5 is a message flow diagram illustrating use of the access token and the key management procedure from FIG. 4 to block a network attack. Referring to FIG. 5, in line 1, an attacker 500 sends a service request with an access token to a producer NF 300. The access token may be signed using a revoked or unauthorized private key. It should be noted that attacker 500 need not have access to a private key to obtain an access token. In one example, attacker 500 may obtain the network access token from the NRF by spoofing the identity of a valid consumer NF in a network access token request. Using the automated key management procedures described herein, the likelihood of successful use of an unauthorized access token is reduced.

The validation procedure for the access token may be as follows: producer NF 300 acting as the resource server receives the resource request with an access token from attacker 500 acting as the resource client. The access token is a JSON web token and specifies the algorithm used to sign the JWS signing input in the token. Suppose the signing algorithm is RS256, which indicates that an RSA private key is used to sign the JWS signing input using the secure hash algorithm (SHA)-256 digital signature algorithm. The JWS signing input, the RSA public key, and the JWS signature are provided to an RSA signature verifier, which reverses the SHA-256 signing process using the RSA public key to produce a value which should match the JWS signing input. If the output from the verifier matches the JWS signing input, the access token is validated and access to the requested service is granted. If output from the verifier does not match the JWS signing input, the access token is not validated, and access to the request service is denied. In this example, it is assumed that the output from the verifier does not match the JWS signing input. Accordingly, in line 2, producer NF 300, after determining that the access token is not valid, responds with a service denied message and may indicate a reason for the denial, such as an invalid token.

It should be noted that while the preceding paragraph discloses using an RSA public key and SHA for signing, the subject matter described herein is not limited to a specific public key format or digital signature algorithm. The automatic key management procedures described herein can be used to manage distribution and status updates for any suitable type of cryptographic key that can be used with any suitable digital signature or message authentication code algorithm to sign and verify a network access token. Thus, the term "public key" as used herein, refers to any suitable cryptographic key that can be used as input to a verifier to verify a digital signature or message authentication code.

Figure 6:
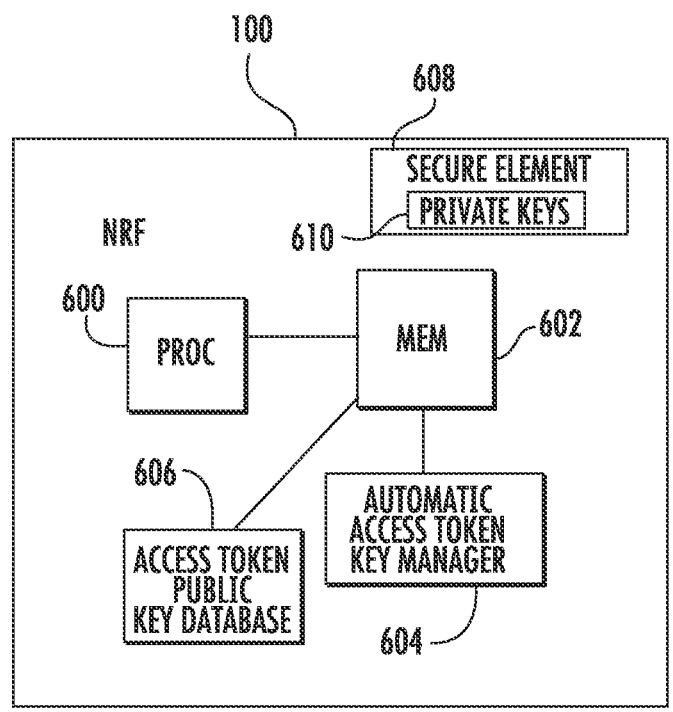
FIG. 6 is a block diagram illustrating an NRF with an automatic access token key manager.

FIG. 6 is a block diagram illustrating an exemplary architecture for NRF 100. Referring to FIG. 6, NRF 100 includes at least one processor 600 and memory 602. NRF 100 further includes an automatic access token key manager 604 that performs the automatic access token key management procedures described herein. NRF 100 may also include an access token public key database 606 that contains public keys used to validate service requests. As indicated above, NRF 100 may maintain different public keys associated with different service access levels. NRF 100 may also include a secure element 608 that stores private keys 610 corresponding to the public keys in public key database 606. As described above, in the public key infrastructure, public and private key pairs are used to sign and verify access tokens. An access token signed with a private key can only be verified using the corresponding public key. If the access token is verified using the public key, the producer NF verifying the access token knows that the access token was signed using the private key maintained by the NRF. In such a case the producer NF grants access to the protected resource, which in 5G networks is the service provided by the producer NF. If the public key has been update using the procedures described herein and an attacker presents an access token signed using a private key corresponding to a revoked public key, access to the protected resource will be denied.

Figure 7:
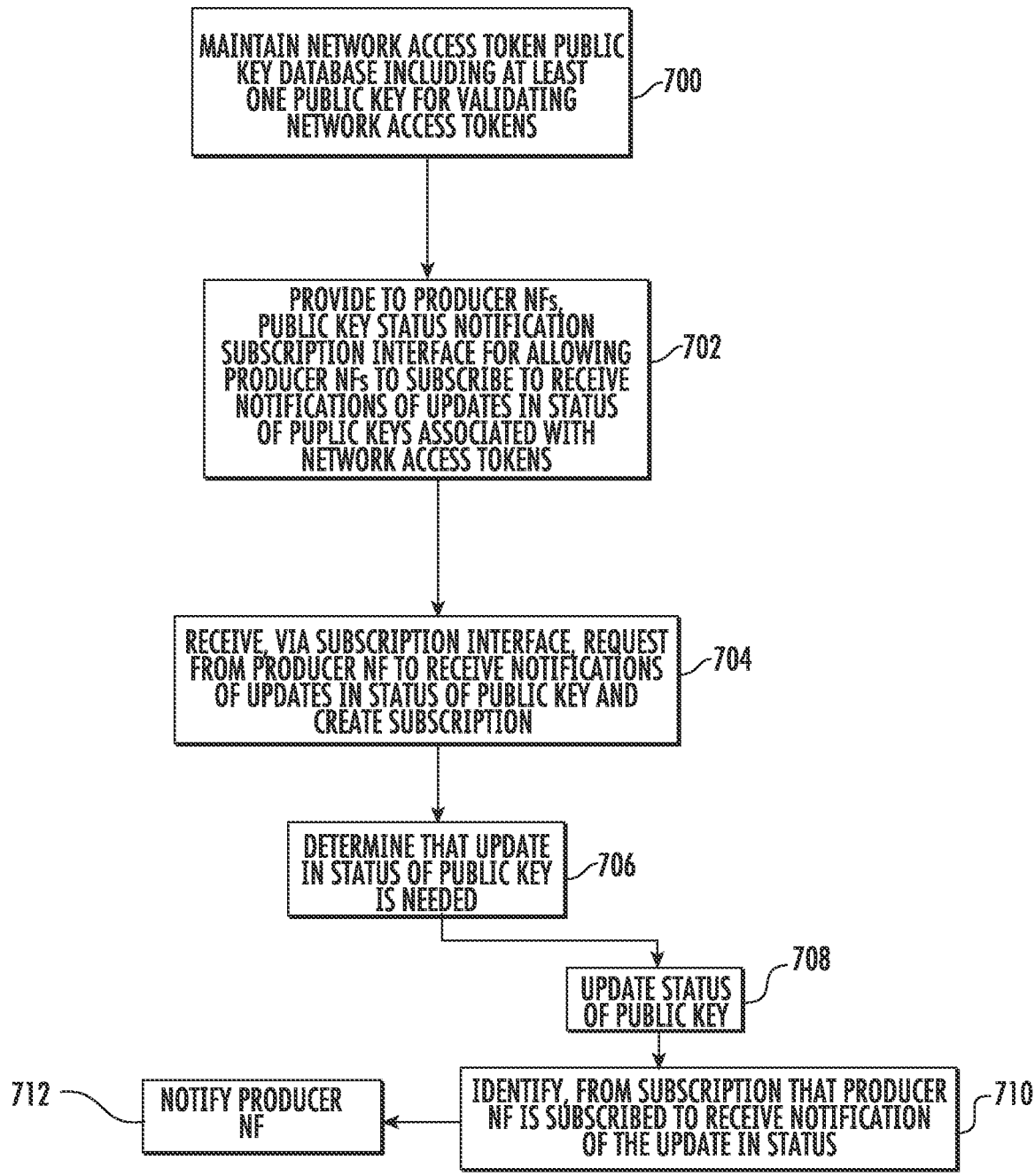
FIG. 7 is a flow chart illustrating an exemplary process for automatic access token key management by an NRF.

FIG. 7 is a flow chart illustrating an exemplary process for automatic access token public key management. Referring to FIG. 7, in step 700, the process includes maintaining a network access token key database including at least one public key for validating network access tokens. For example, NRF 100 may maintain access token public key database 606 in memory 602. The public keys may correspond to producer NFs, PLMNs, network slices, or other service access level.

In step 702, the process includes providing, to producer NFs, a network access token public key status notification subscription interface for allowing the producer NFs to subscribe to and receive notifications of updates in status of public keys associated with network access tokens. For example, NRF 100 may provide an API that allows producer NFs the ability to subscribe to receive notifications of changes in status of access token public keys.

In step 704, the process includes receiving, via the network access token public key status notification subscription interface, a request from a producer NF to receive notifications of updates in status of public keys and creates a subscription. For example, NRF 100 may receive an access token public key subscription request from a producer NF and create or update a record in its local database to indicate that the producer NF is to be notified when the change in status of an access token public key occurs.

In step 706, the process includes determining that a change in status or an update in status of a public key is needed. For example, NRF 100 may detect that a key or an access token signed using a private key corresponding to the public key has been compromised. In an alternate scenario, NRF 100 may automatically renew or revoke access token public keys after expiration of a time period.

In step 708, the process includes updating the status of the public key. Updating the status of the public key may include renewing the public key or revoking the public key. Renewing the public key may include simply sending a renewal message to producer NFs indicating that the public key currently being used is still valid. Revoking the public key may include sending a message to the producer NFs indicating that the public key is no longer valid and replacing the old key with a new key.

Once the status is updated in the database maintained by the NRF, control proceeds to step 710 where the NRF identifies, from the subscriptions, producer NFs subscribed to receive notifications of the update and status. In step 712, the NRF notifies the consumer NFs.

Advantages of the subject matter described herein include the avoidance of manual key management at the NRF of access token public keys. The subject matter described herein allows automatic renewal of NRF access token public keys at producer NFs without the need of manual intervention and without an impact on service. The NRF can use different key pairs at the PLMN level, slice level, NF type level, service level, or other service access level for signing the access token. This provides additional security hardening for management of NRF access token public keys. The subscription service described herein can be used by any 5G NF, including a PCF, binding support function (BSF), NSSF, NEF, UDM, AUSF, or UDR, as a value added security feature. In addition, the subscription service may be used by an SCP on behalf of producer NFs.

The disclosure of each of the following references is incorporated herein by reference in its entirety.

REFERENCES

1. IETF RFC 5246; The Transport Layer Security (TLS) Protocol, Version 1.2; August 2008
2. IETF RFC 3280; Internet X.509 Public Key Infrastructure Certificate and Certificate Revocation List (CRL) Profile, April 2002.
3. IETF RFC 6749: The OAuth 2.0 Authorization Framework, October 2012.
4. IETF RFC 6750: The OAuth 2.0 Authorization Framework: Bearer Token Usage, October 2012.
5. IETF RFC 7519: JSON Web Token (JWT), May 2015.
6. IETF RFC 7515: JSON Web Signature (JWS), May 2015.
7. 3GPP TS 29.573; $3^{rd}$ Generation Partnership Project; Technical Specification Group Core Network and Terminals; 5G System; Public Land Mobile Network (PLMN) Interconnection; Stage 3 (Release 16) V16.4.0 (2020-09)
8. 3GPP TS 33.501; $3^{rd}$ Generation Partnership Project; Technical Specification Group Services and System Aspects; Security Architecture and Procedures for the 5G System; (Release 16), V16.4.0 (2020-09).
9. 3GPP TS 29.510; $3^{rd}$ Generation Partnership Project; Technical Specification Group Core Network and Terminals; 5G System; Network Function Repository Services; Stage 3 (Release 16), V16.5.0 (2020-09).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for automatic key management of network access token public keys for 5G core (5GC) authorization to mitigate security attacks, the method comprising:
    at a network function (NF) repository function (NRF) including at least one processor and a memory:
        maintaining in the memory, a network access token public key database including at least one public key for use by producer NFs in validating network access tokens presented in service requests from consumer NFs, wherein the at least one public key comprises at least one public key of the NRF that corresponds to at least one private key of the NRF used by the NRF to digitally sign portions of the network access tokens;
        providing, to the producer NFs, a network access token public key status notification subscription interface for allowing the producer NFs to subscribe to receive notification of updates in status of the at least one public key;
        receiving, via the network access token public key status notification subscription interface, a request from a producer NF to be notified of updates in status of the at least one public key, and, in response, creating a subscription for the producer NF;
        determining that an update in status of the at least one public key is needed;
        in response to determining that the update in status of the at least one public key is needed:
            updating the status of the at least one public key, wherein updating the status of the at least one public key includes revoking the at least one public key;
            identifying, from the subscription, that the producer NF is subscribed to receive notification of updates in status of the at least one public; and
            notifying the producer NF of the update in status of the at least one public key, wherein notifying the producer NF of the change in status includes sending a message to the producer NF indicating that the at least one public key is no longer valid and replacing the at least one public key with at least one replacement public key.

2. The method of claim 1 wherein maintaining the network access token public key database includes maintaining, in the network access token public key database, a plurality of public keys, at least some of which are associated with different service access levels.

3. The method of claim 2 wherein the different service access levels include a public land mobile network (PLMN) service level, a network slice level, an NF type level, and a service level.

4. The method of claim 3 wherein the at least one public key is associated with one of the service access levels and wherein revoking the at least one public key includes revoking the at least one public key at the one service access level.

5. The method of claim 1 wherein providing the public key status notification subscription interface includes providing an interface for receiving subscription requests from the producer NFs, where the subscription requests can include service access level identification information and a request for an immediate key.

6. The method of claim 5 wherein the subscription request includes the request for an immediate key and further comprising communicating a public key to the producer NF in response to the subscription request.

7. The method of claim 1 wherein creating the subscription includes creating or updating a record in the database to identify the NF as a subscriber to the updates in status of the at least one public key.

8. The method of claim 1 wherein determining that an update in status of the at least one public key is needed includes determining that at least one network access token signed using at least one private key corresponding to the at least one public key has been compromised.

9. The method of claim 1 wherein determining that a change in status of the at least one public key is needed includes determining that a revocation of the at least one public key is needed in response to expiration of a configurable time period.

10. The method of claim 1 comprising, at the producer NF:
    receiving the message including the at least one replacement public key for the at least one public key;
    receiving a service request from a consumer NF, the service request including a network access token;
    attempting to validate the service request using the at least one replacement public key;
    determining that the validation fails; and
    preventing the consumer NF from accessing a service identified in the service request.

11. A system for automatic key management of network access token public keys for 5G core (5GC) to mitigate security attacks, the system comprising:

a network function (NF) repository function (NRF) including at least one processor and a memory;

a network access token public key database located in the memory and including at least one public key for use by producer NFs in validating network access tokens presented in service requests from consumer NFs, wherein the at least one public key comprises at least one public key of the NRF that corresponds to at least one private key of the NRF used by the NRF to digitally sign portions of the network access tokens; and an automatic access token key manager implemented by the at least one processor for maintaining the network access token public key database, providing, to the producer NFs, a network access token public key status notification subscription interface for allowing the producer NFs to subscribe to receive notification of updates in status of the at least one public key, receiving, via the network access token public key status notification subscription interface, a request from a producer NF to be notified of updates in status of the at least one public key, and, in response, creating a subscription for the producer NF, determining that an update in status of the at least one public key is needed, and in response to determining that the update in status of the at least one public key is needed: updating the status of the at least one public key; identifying, from the subscription, that the producer NF is subscribed to receive notification of updates in status of the at least one public key; and notifying the producer NF of the update in status of the at least one public key, wherein updating the status of the at least one public key includes revoking the at least one public key and notifying the producer NF of the change in status includes sending a message to the producer NF indicating that the at least one public key is no longer valid and replacing the at least one public key with at least one replacement public key.

12. The system of claim 11 wherein the automatic access token key manager is configured to maintain, in the network access token public key database, a plurality of public keys, at least some of which are associated with different service access levels.

13. The system of claim 12 wherein the different service access levels include a public land mobile network (PLMN) level, a network slice level, an NF type level, and a service level.

14. The system of claim 13 wherein the at least one public key is associated with one of the service access levels and wherein revoking the at least one public key includes revoking the at least one public key at the one service access level.

15. The system of claim 11 wherein the subscription interface is configured to receive subscription requests from the producer NFs, where the subscription requests can include service access level identification information and a request for an immediate key.

16. The system of claim 15 wherein the subscription request includes the request for an immediate key, and, in response to receiving the request for an immediate key, the automatic access token key manager is configured to communicate a public key to the producer NF in response to the subscription request.

17. The system of claim 11 wherein, in creating the subscription, the automatic access token key manager is configured to create or update a record in the database to identify the NF as a subscriber to the updates in status of the at least one public key.

18. The system of claim 11 wherein the automatic access token key manager is configured to determine that an update in status for the at least one public key is needed in response to determining that at least one network access token signed using at least one private key corresponding to the at least one public key has been compromised.

19. The system of claim 11 wherein the automatic access token key manager is configured to determine that an update in status for the at least one public key is needed in response to expiration of a configurable time period.

20. A non-transitory computer readable medium having stored thereon executable instructions that when executed by a processor of a computer control the computer to perform steps comprising:

maintaining, in the non-transitory computer readable medium, a network access token public key database including at least one public key for use by producer network functions (NFs) in validating network access tokens presented in service requests from consumer NFs, wherein the at least one public key comprises at least one public key of the NRF that corresponds to at least one private key of the NRF used by the NRF to digitally sign portions of the network access tokens;

providing, to the producer NFs, a network access token public key status notification subscription interface for allowing the producer NFs to subscribe to receive notification of updates in status of the at least one public;

receiving, via the network access token public key status notification subscription interface, a request from a producer NF to be notified of updates in status of the at least one public key, and, in response, creating a subscription for the producer NF;

determining that an update in status of the at least one public key is needed;

in response to determining that the update in status of the at least one public key is needed:

updating the status of the at least one public key, wherein updating the status of the at least one public key includes revoking the at least one public key;

identifying, from the subscription, that the producer NF is subscribed to receive notification of updates in status of the at least one public key; and notifying the producer NF of the update in status of the at least one public key, wherein notifying the producer NF of the change in status includes sending a message to the producer NF indicating that the at least one public key is no longer valid and replacing the at least one public key with at least one replacement public key.

* * * * *

UNITED STATES PATENT AND TRADEMARK OFFICE
CERTIFICATE OF CORRECTION

PATENT NO. : 11,895,501 B2
APPLICATION NO. : 17/115746
DATED : February 6, 2024
INVENTOR(S) : Rajput et al.

It is certified that error appears in the above-identified patent and that said Letters Patent is hereby corrected as shown below:

In the Specification

In Column 2, Line 39, delete "that that" and insert -- that --, therefor.

In the Claims

In Column 14, Line 7, in Claim 1, delete "public;" and insert -- public key; --, therefor.

In Column 16, Line 37, in Claim 20, delete "public;" and insert -- public key; --, therefor.

Signed and Sealed this
Fourteenth Day of May, 2024

Katherine Kelly Vidal
*Director of the United States Patent and Trademark Office*